United States Patent [19]
Norden

[11] Patent Number: 5,867,576
[45] Date of Patent: Feb. 2, 1999

[54] SWITCHING RECEPTACLE

[75] Inventor: Alexander R. Norden, Boca Raton, Fla.

[73] Assignee: Eugene A. Norden, New York, N.Y.

[21] Appl. No.: 766,796

[22] Filed: Dec. 13, 1996

[51] Int. Cl.$^6$ .............................. H04M 1/00; H01R 29/00
[52] U.S. Cl. ............................................ 379/438; 439/188
[58] Field of Search ................................. 379/422, 438, 379/437; 439/188

[56] References Cited

U.S. PATENT DOCUMENTS 4,087,151  5/1978  Robert et al. .
4,438,303  3/1984  Astier .
4,552,423  11/1985  Swengel .
4,725,241  2/1988  Bertini .
5,030,123  7/1991  Silver .
5,195,125  3/1993  Bliven et al. .
5,450,469  9/1995  Pamart et al. .
5,704,797  1/1998  Meyerhoefer et al. .................. 439/188

*Primary Examiner*—Jack Chiang

[57] ABSTRACT

A test interface for a telephone service panel includes a receptacle having switching contacts for normally connecting a network line to a subscriber line. A contact of each pole of the receptacle has an actuator operable by an inserted plug of a test device, independent of mating contacts of the receptacle and the plug-in device. One switching contact of each pole is fixed in place and has a resilient extension engageable by a plug-in device.

20 Claims, 2 Drawing Sheets

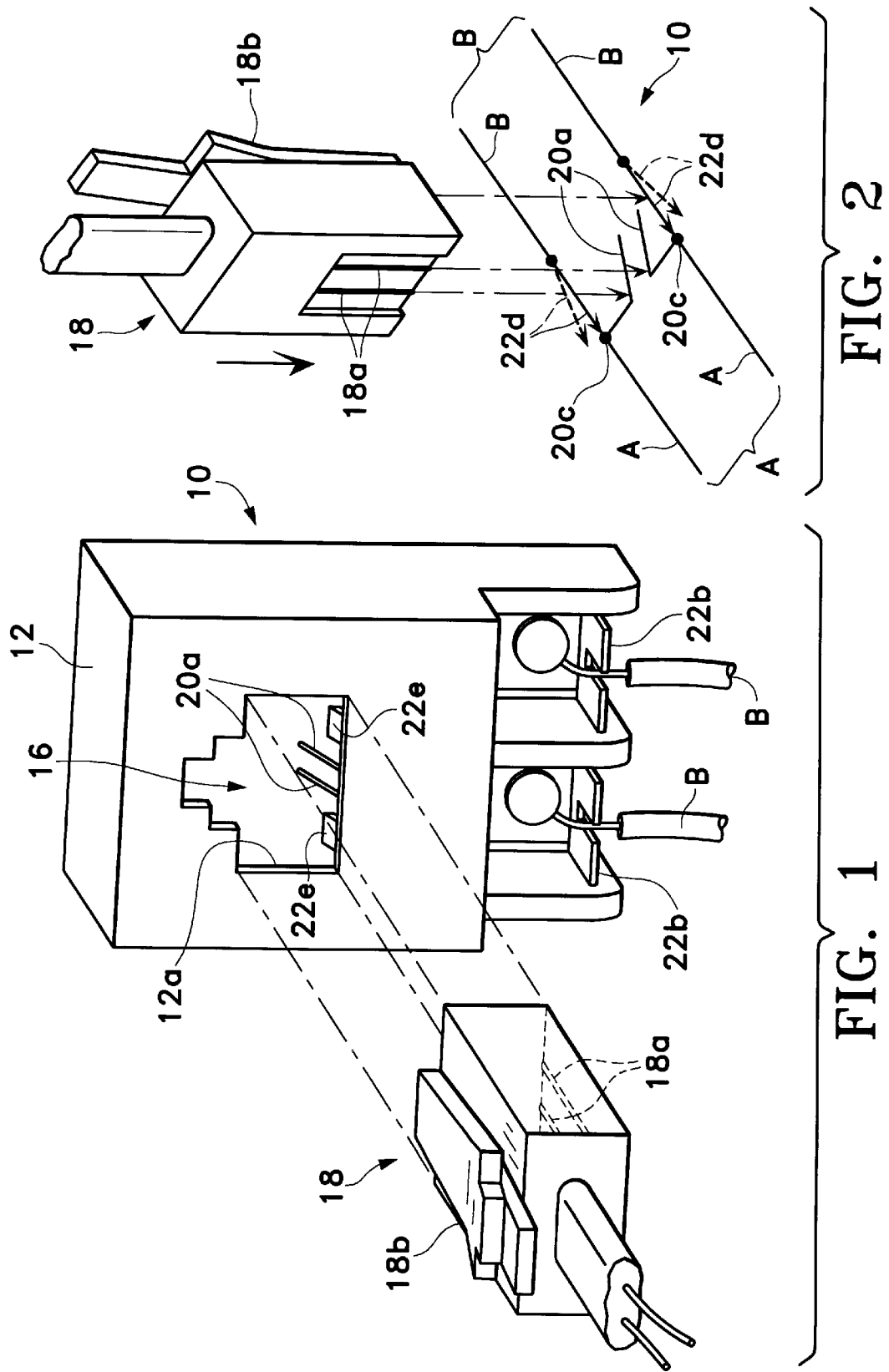

SWITCHING RECEPTACLE

The present invention relates to an interface in telephone networks for making a test to ascertain the location of a fault, as between a line in a telephone company's network and a subscriber's line and, more specifically, this invention relates to a switching receptacle which is useful as an interface for making tests and for other applications.

BACKGROUND OF THE INVENTION

Test interface equipment has been incorporated for some time in telephone entrance panels. In one form, the test interface equipment involves a jack or receptacle to which a line of a distribution network is connected; plug connected to a subscriber's line normal remains in that receptacle and connects the subscriber's line to, the network line. When a test is to be performed using that form of interface, the plug of the subscriber's line is removed from the receptacle as a first step in the test procedure, and a plug of a test device is then inserted into the jack. The test device may be a telephone that is known to be in proper working order. If (and only if) the test device works properly in this test, the network line is known to be in good working condition. Accordingly, the trouble that prompted the test must be in the subscriber's line.

In the interest of simplifying the test and reducing the cost of the interface panel, modified forms of test interface have been developed. In one modified test interface, a switching receptacle is provided which connects the subscriber's line to a network line when the receptacle is empty. When the plug of a test device is inserted into the receptacle, the subscriber's line is disconnected and the receptacle connects the test device to the network line. To be compatible with telephone distribution lines, the receptacle advantageously adopts the standardized configuration used in telephone system practice, as represented by the RJ-11 or RJ-45 configurations mentioned in U.S. Pat. No. 5,030,123, issued Jul. 9, 1991, to Silver.

SUMMARY OF THE INVENTION

The present invention provides a novel switching receptacle.

The illustrative embodiment of the invention described in detail below and shown in the accompanying drawings is a switching receptacle intended primarily as an interface between a line of a telephone network ("network line") and a subscriber's line. While the described receptacle is a two-pole device for use with a two-wire line of a telephone network and a two-wire subscriber's line, and it has the standardized configuration of jacks used in telephone practice, the invention has other-than-telephone applications and it may have any desired number of poles as indicated in the '123 patent to Silver, supra.

Each pole of the described receptacle includes two components (A) for connection to the respective wires of a two-wire line of a telephone network ("network components"). The receptacle also has two components (B) for connection to respective wires of a two-wire subscriber line ("subscriber's components")

Each component A includes a resilient wire that extends into the socket of the receptacle, providing a long and resilient contact as in RJ-11 jacks. That extension is part of a wire having a portion fixed in the insulating structure. That fixed portion serves as a switching contact.

Component B of each pole consists of a resilient sheet-metal stamping in the illustrative receptacle. A resilient portion of the stamping extends from a portion that is fixed to the insulating structure. The resilient portion of component B includes a contact which is normally biased firmly against the fixed contact portion of the wire of component A. The contact-bearing portion of component B also includes an actuator that normally projects into the receptacle's socket for engagement with the body of insulation of the plug being inserted.

The mutually engaging pairs of contacts of components A and B constitute a normally closed switch. When a test plug is forced into the socket of the receptacle, the actuators of components B are deflected; the pairs of contacts are parted, disconnecting the subscriber's line from the telephone line. The inserted plug also connects the test device to the test contacts in the socket.

The wire that forms the test contact in the socket and which constitutes a switching contact is commonly gold-plated in telephone practice. Both that wire and at least the switching contact portion of each stamping of the illustrative receptacle are plated with a metal, gold or tin, that assures dependable contact. Moreover, the switching contact pairs of the illustrative receptacle are contained in a pocket formed by the insulating support. In outdoor service of the receptacle, the switching contact pairs are immersed in a grease or gel in that pocket, for protecting the switching contacts against atmospheric deterioration.

The insulating structure of the receptacle provides a pocket that contains the pairs of switching contacts, which are thus largely isolated from the socket that receives the test plug. Accordingly, those contacts are shielded against random particles that might enter the socket of the receptacle.

The nature of the invention and further novel aspects and attributes will be more fully appreciated from the following detailed description of an illustrative embodiment, which is shown in the accompanying drawings.

BRIEF DESCRIPTION OF THE DRAWINGS

FIG. 1 is a somewhat diagrammatical exploded view of a novel receptacle embodying aspects of the invention, together with a plug to be received in the receptacle;

FIG. 2 is a diagrammatic representation of the circuit formed by the apparatus of FIG. 1;

DETAILED DESCRIPTION OF THE ILLUSTRATIVE EMBODIMENT

Figure 6:
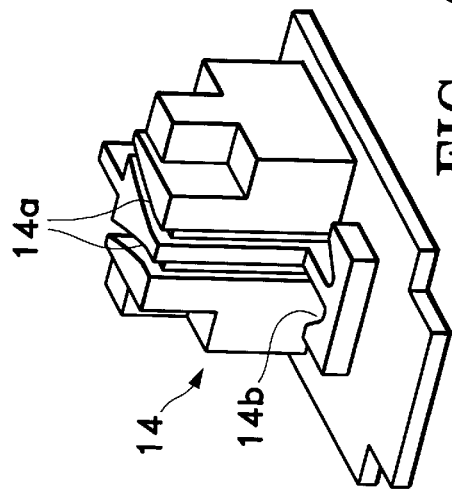
FIG. 6 is a perspective view of a core of insulation that forms part of the structure of insulation of the novel receptacle.
Figure 5:
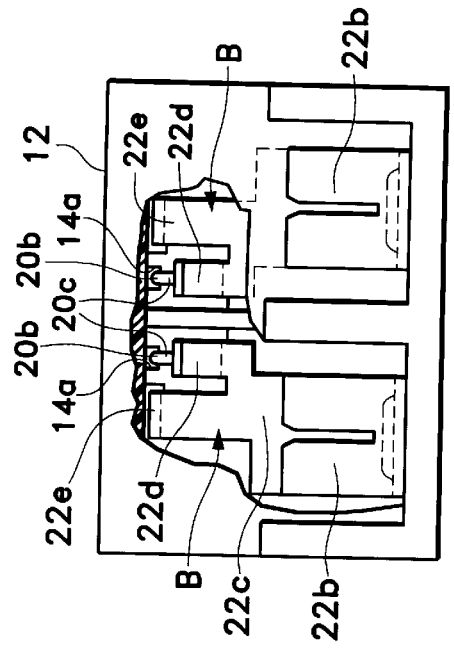
FIG. 5 is a view of the novel receptacle of FIGS. 1, 3 and 4, as seen from the right of FIG. 4, portions being broken away to reveal portions of the inner structure.
Figure 3:
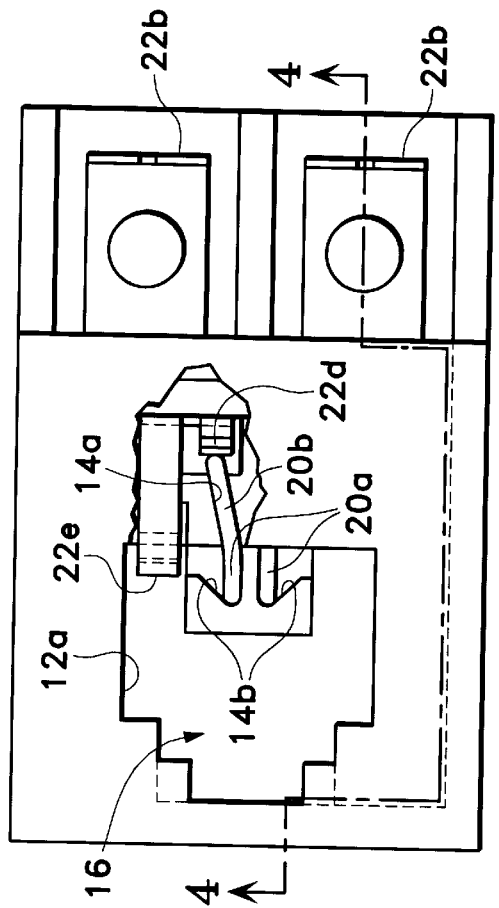
FIG. 3 is a top plan view of the novel receptacle of FIG. 1, portions being broken away to reveal part of the internal structure.

In FIG. 2, receptacle 10 is represented as having two poles for connecting the bracketed pair of wires A of a network line to a bracketed pair of wires B of a subscriber line. Each pole of the receptacle has conductive components (bearing designations A and B in FIG. 4) corresponding to their connected wires. Thus, diagrammatically represented switches 20c/22d of the receptacle connect corresponding components A and B of the poles of the receptacle. When plug 18 in FIG. 2 is inserted into the receptacle (note the arrow), contacts 18a become connected to contacts 20a off components A of the receptacle's two poles, and the switches are opened as represented by their dotted line positions, causing subscriber components B of the receptacle's poles to be disconnected from network components A.

FIGS. 1 and 3–6 show an illustrative form of novel apparatus that embodies the various aspects of the invention. FIGS. 3–6 show the receptacle, including internal details; FIG. 1 additionally includes plug 18 of test apparatus, ordinarily a telephone known to be in good working condition. Plug 18 is to be received in socket 16 of receptacle 10. Under ordinary circumstances, receptacle 10 performs a switching function, i.e., it connects two wires B of a subscriber line to two telephone network wires 20e-(A)—see FIGS. 2 and 4. When the plug is inserted, the receptacle disconnects the subscriber's line, and terminals 18a of plug 18 are connected via the receptacle to network wires 20e/(A).

Plug 18 is inserted into the receptacle when trouble develops in the telephone service. When plug 18 is inserted into receptacle 10, the telephone or other test apparatus connected to plug 18 performs as it should if the network line is in good working condition, and then the fault is known to be present in the subscriber's line. If trouble persists while the test device is plugged-in, the network line is shown to be faulty.

Receptacle 10 includes a shell 12 of insulation containing and united to core 14 (FIG. 6) of insulation. That composite structure of insulation also includes suitable means (not shown) for securing the receptacle in place as a replaceable module of a telephone service panel. Opening 12a in shell 12 admits the plug; opening 12a, complemented by core 14, define the plug-receiving socket 16 of the receptacle.

Plug 18 has the usual latch 18b of RJ-11 standard plug-in apparatus for releaseably retaining the plug in the socket.

Each pole of the receptacle includes what are here called two "components". Each "component" consists of all the conductive structure of a pole between a terminal of the receptacle and paired contacts that open and disconnect the normally connected lines.

As represented in FIG. 2, receptacle 10 has two poles for connecting the two wires of line A to the two wires of line B, respectively. When the socket of the receptacle is empty, conductive component A of each pole (FIG. 4) is connected to corresponding conductive pole B by the switching contacts of their pole, represented in FIG. 2 by an imaginary switch in its solid-line position. When plug 18 is inserted into the receptacle, terminals 18a of the plug engage contacts 20a, the usual plug-in contacts of an RJ-11 jack. When plug 18 enters the receptacle, the imaginary switches move to their dotted-line positions in FIG. 2, and disconnect components B from components A of the receptacle.

Figure 4:
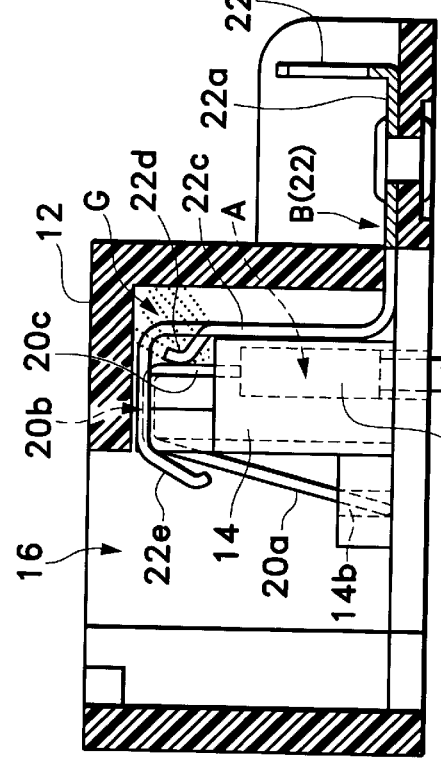
FIG. 4 is a cross-section, in elevation, of the novel receptacle of FIGS. 1 and 3, as seen from the cross-section line 4—4 in FIG. 3.

In FIG. 4, each component A comprises a resilient wire having portions 20a, 20b, 20c connected to a terminal wire 20e/(A) by a crimp fastener 20d. These connected elements constitute component A. Due to the bent configuration of wire 20a, 20b, 20c, and due to wire-receiving grooves 14a in core 14, and due also to overlying shell 12, wire portions 20b and 20c are fixed in the receptacle. Wire portion 20a extends into socket 16 near opening 12a in shell 12, at one side of the socket and it extends slantwise to the bottom of the socket. The free end of wire portion 20a is received in V-shaped guide pocket 14b in core 14.

Each pole of the receptacle includes a second component B which extends from its terminal of the receptacle to a switching contact that connects components A and B of that pole. In that receptacle, each component B is a metal stamping 22. A portion 22a of the stamping is fixed to shell 12 by a rivet as shown. Slotted end portion 22b forms an insulation displacement connector (IDC) which is connected (FIG. 1) to a wire of line B. Alternative fasteners may be used in place of the IDC terminals. An upstanding portion 22c of the stamping supports contact portion 22d and provides spring bias that normally maintains contact portions 20c and 22d in firm engagement with each other. Stamping 22 has an arm that overhangs but is clear of core 14, having a cam-like end portion 22e that projects into socket 16. This arm and its cam-like end constitute an actuator for contact 22d. When plug 18 is forced into socket 16, the actuator is shifted by a portion of the plug that is formed of insulation; each actuator drives contact 22d of a component B away from wire portion 20c. The actuator overcomes the self-bias provided by the stamping. (Contacts 20c/22d constitute switch 10a of FIG. 2.)

Wire 20a, 20b, 20c is commonly gold-plated in telephone practice and companion contact portions 22d may also be gold-plated for assuring dependable contact performance. If desired, tin may replace gold. The two normally closed pairs of contacts are contained in a restricted space or pocket formed by shell 12 and core 14 that constitute the insulating structure of the receptacle. When a receptacle is designated for outdoor service, the dependability of the contact pairs and their resistance to atmospheric deterioration may be enhanced by filling the pocket with a protective gel or grease so that the contacts are immersed in that contact-protective material.

The slant attitude of elongated resilient contact portion 20a is well suited for dependable cooperation with a terminal 18a of a test plug 14. This relationship is the same as that of usual RJ-11 receptacles; it is not under any constraint related to the switching function performed by pairs of contacts 20c, 22d.

As described above, actuators 22e are portions of the subscriber's parts B of the poles in the receptacle; actuators 22e are disposed in the path of insertion of a plug 18 into socket 16, to be deflected by the plug. Such deflection occurs before the plug reaches resilient contacts 20a; also, in particular, it occurs before contacts 18a of the plug (FIG. 2) reach contacts 20a. Accordingly, as a plug 18 is being inserted into socket 16, the pairs of switching contacts 20c/22d break connection of the network conductors A to the subscriber conductors B in both poles of the receptacle before the network conductors A can make connection to the circuit of the plug being inserted. In turn, this signifies that the circuit of the plug cannot be connected to the subscriber circuit.

The illustrative example of the present invention is highly effective for its intended purposes. However, because those skilled in the art will readily devise modifications, the invention should be construed broadly consistent with its true spirit and scope.

I claim:

1. Interface apparatus having a switching receptacle that normally connects a subscriber line to a network line, operation of the switching receptacle by an inserted plug of a test device causing the test device to be substituted for the subscriber line, the improvement wherein said switching receptacle includes:

a structure of insulation that provides a test plug receiving socket, multiple poles for connecting the network line to a subscriber line, each of said poles including a network component and a subscriber component supported by said structure of insulation, the network components of said poles including respective fixed network portions and having elongated, generally parallel resilient contacts extending from said fixed network portions into the socket from a side of the socket slantwise relative to the path of insertion of a plug for engagement by respective contacts of the test plug, said subscriber components having subscriber contacts in proximity to said fixed portions of said network components, respectively, and means for biasing said subscriber contacts into firm engagement with said fixed network portions when said socket is empty, and actuators projecting from a side of the socket into the path of insertion of a test plug into the socket so as to be shifted by a test plug being inserted, said actuators when shifted being arranged to drive the respective subscriber contacts away from said network portions.

2. A switching receptacle as in claim 1, wherein each of said subscriber components is a sheet-metal part that incorporates a said subscriber contact and a said biasing means and a said actuator.

3. A switching receptacle as in claim 2, wherein the sheet-metal part of each subscriber component further includes an IDC terminal for making connection to a wire of a subscriber's line.

4. A switching receptacle as in claim 1, wherein said structure of insulation provides a pocket offset laterally from said socket, said line contacts being disposed in said pocket.

5. Interface apparatus as in claim 1, wherein said actuators and said parallel resilient contacts are arranged for engagement in the named sequence by a plug of a test device being inserted into the socket so that the subscriber contacts are driven away from said network portions before said parallel resilient contacts are reached by companion contacts of the plug.

6. A switching receptacle having multiple poles for normally connecting a subscriber line to a network line, wherein the subscriber line is disconnected and a test device is connected to the network line when a test plug of the test device is inserted into the. receptacle, said receptacle including a structure of insulation that provides a test-plug-receiving socket and said switching receptacle having multiple poles supported by said structure of insulation, each of said poles having a network switching contact, and each of the poles having a subscriber switching contact that is paired with and is normally engaged by a corresponding network switching contact, actuating means for separating said normally engaged contacts, said actuating means including actuators extending integrally from said subscriber switching contacts, respectively, and projecting into said socket from a side of the socket so as to be operable by a test plug, said poles further having elongated generally parallel slender resilient conductors extending integrally from said network switching contacts, respectively, into the socket for engagement by contacts of a test plug.

7. A switching receptacle as in claim 6, wherein each pole of the receptacle comprises a subscriber component and a network component, said subscriber component of each pole consisting of a metal stamping for each pole that incorporates the actuator and the subscriber contact of that pole.

8. A switching receptacle as in claim 6, wherein said structure of insulation forms a pocket offset laterally from said socket, said contacts being disposed in said pocket.

9. A switching receptacle as in claim 8, wherein said contacts in said pocket are immersed in a gel or grease for protecting said contacts from atmospheric deterioration.

10. A switching receptacle as in claim 8, wherein said structure of insulation forms a pocket which is offset laterally from said socket and which contains said contacts.

11. A switching receptacle as in claim 10, wherein said pocket contains grease or a gel immersing said contacts, to provide protection of the contacts against atmospheric deterioration.

12. A switching receptacle as in claim 6, wherein said actuators are disposed in the insertion paths of a plug into said socket for engagement and deflection of the actuators by the test plug before companion contacts of the test plug reach the elongated resilient contacts, accordingly causing the subscriber contacts to part from the network switching contacts before the elongated resilient contacts extending from the network, components can be engaged by companion contacts of said plug.

13. A switching receptacle having one or more poles for normally connecting one or more wires I to one or more wires II, respectively, wherein insertion of a plug-in device into the receptacle causes wires I and II to be disconnected and causes each wire I to be connected to a respective terminal of the plug-in device, each pole consisting of a component A and a component B having respective switching contacts, and a structure of insulation supporting components A and B and providing a socket for receiving a plug-in device bearing one or more terminals, an integral portion of each component B constituting an actuator that projects into said socket for operation by a plug-in device to drive the switching contact of component B away from the switching contact of component A, thereby disconnecting components A and B, each said component A additionally having, as an integral portion thereof, an elongated slender resilient conductor disposed slantwise in said socket for engagement by a terminal of the plug-in device, a portion of said elongated resilient conductor being fixed in place by said structure of insulation and constituting said switching contact of component A.

14. A switching receptacle as in claim 13, wherein each said component B consists of a sheet-metal stamping that comprises said actuator and the switching contact of component B.

15. A switching receptacle as in claim 14, wherein each said actuator and the switching contact moved thereby are integral portions of a sheet-metal stamping, a portion of which is fixed to said structure of insulation.

16. A switching receptacle as in claim 13, wherein said elongated conductor, including said switching contact of component B, is plated with a metal that enhances contact dependability, namely, gold or tin.

17. A switching receptacle as in claim 16, wherein said structure of insulation forms a pocket containing said contacts and wherein said pocket is offset laterally from said socket and contains grease or a gel immersing said contacts, to provide protection of the contacts against atmospheric deterioration.

18. A switching receptacle including a structure of insulation defining a socket having an opening for receiving the plug of a test device and said structure defining a cavity to one side of the socket, said cavity containing a subscriber's line contact and a network line contact in mutual engagement when the socket is empty, an actuator integral with said subscriber's line contact and extending into said socket at a side thereof, to be shifted by the plug of a test device being inserted into the socket to drive said subscriber line contact away from said network line contact, and an elongated and resilient conductor extending integrally from said network line contact slantwise in said socket for engagement with a companion contact of an inserted plug.

19. A switching receptacle having a structure of insulation that provides a socket for receiving the plug of a test device, said receptacle including multiple poles each of which comprises a subscriber conductor and a network conductor supported by said structure of insulation, each of said network conductors having a network switching contact and each of said subscriber conductors having a subscriber switching contact, the latter being biased into engagement with a corresponding one of said network switching contacts when the socket is empty, and said receptacle having network contact elements disposed in said socket and connected to said network conductors, respectively, said network contact elements being disposed for engagement by corresponding contacts of a plug when received in the socket, each of said subscriber switching contacts having an actuator so disposed in relation to the path of insertion of a plug into said socket as to be deflected during plug insertion, said actuators and said network contact elements being so positioned in relation to each other that the network contact elements are engageable by corresponding, contacts of a plug being inserted into the socket only after the subscriber switching contacts are disengaged from the network switching contacts.

20. A switching receptacle as in claim 19, further including a plug receivable in said socket and engageable with said actuators initially during insertion of the plug into the socket and said plug having plug contact elements engageable with said network contact elements only after the plug has caused said subscriber switching contacts to part from said network switching contacts.

* * * * *